May 19, 1936.　　H. L. CARPENTER　　2,041,398
REMOTE CONTROL SYSTEM
Filed Jan. 25, 1928　　6 Sheets-Sheet 1
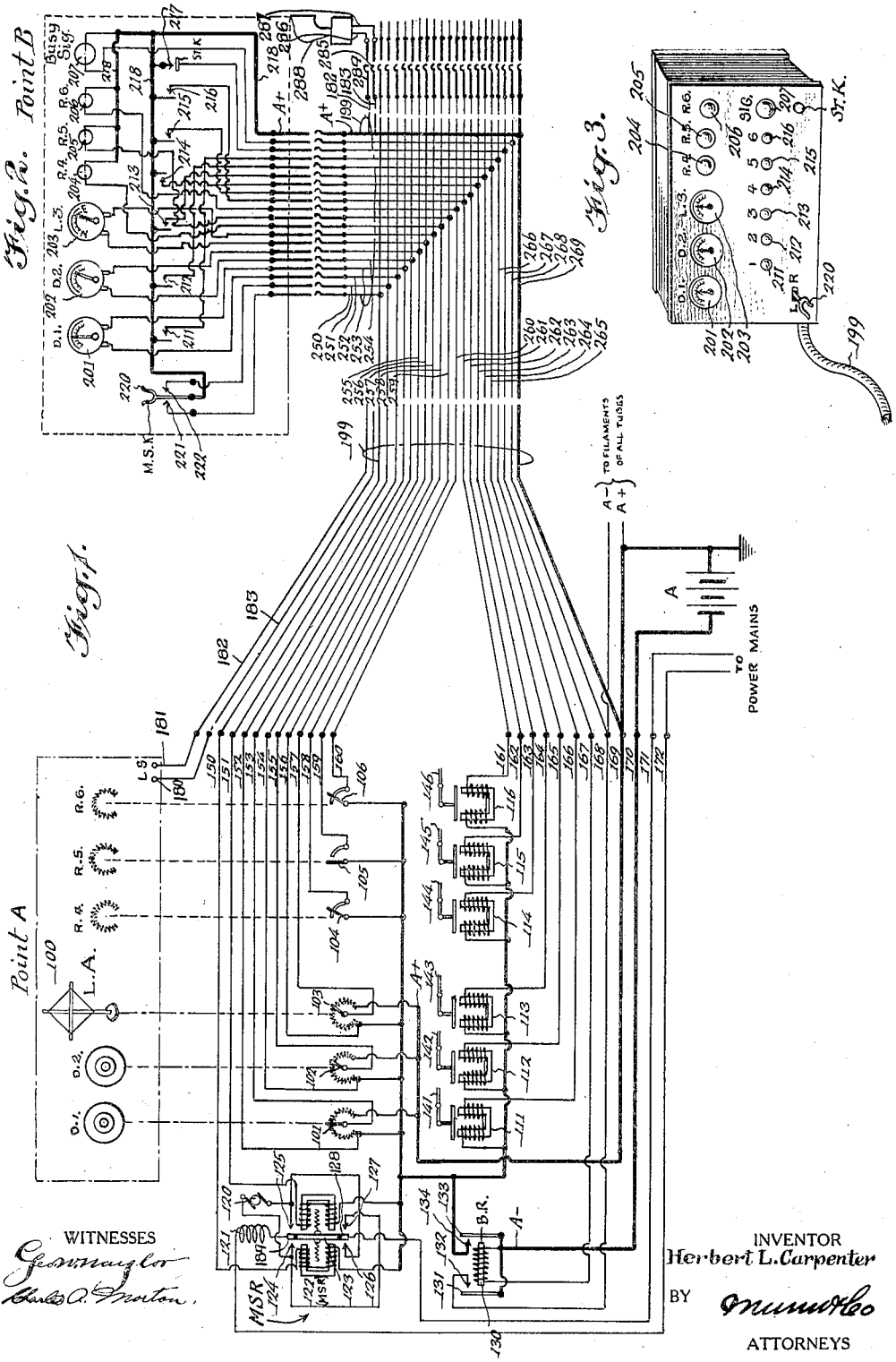
WITNESSES
INVENTOR
Herbert L. Carpenter
BY
ATTORNEYS May 19, 1936.  H. L. CARPENTER  2,041,398
REMOTE CONTROL SYSTEM
Filed Jan. 25, 1923   6 Sheets-Sheet 2

WITNESSES

INVENTOR
Herbert L. Carpenter
BY
ATTORNEYS

May 19, 1936.  H. L. CARPENTER  2,041,398
REMOTE CONTROL SYSTEM
Filed Jan. 25, 1928  6 Sheets-Sheet 3

WITNESSES

INVENTOR
Herbert L. Carpenter
BY
ATTORNEYS

May 19, 1936. H. L. CARPENTER 2,041,398
REMOTE CONTROL SYSTEM
Filed Jan. 25, 1923 6 Sheets-Sheet 4

INVENTOR
Herbert L. Carpenter

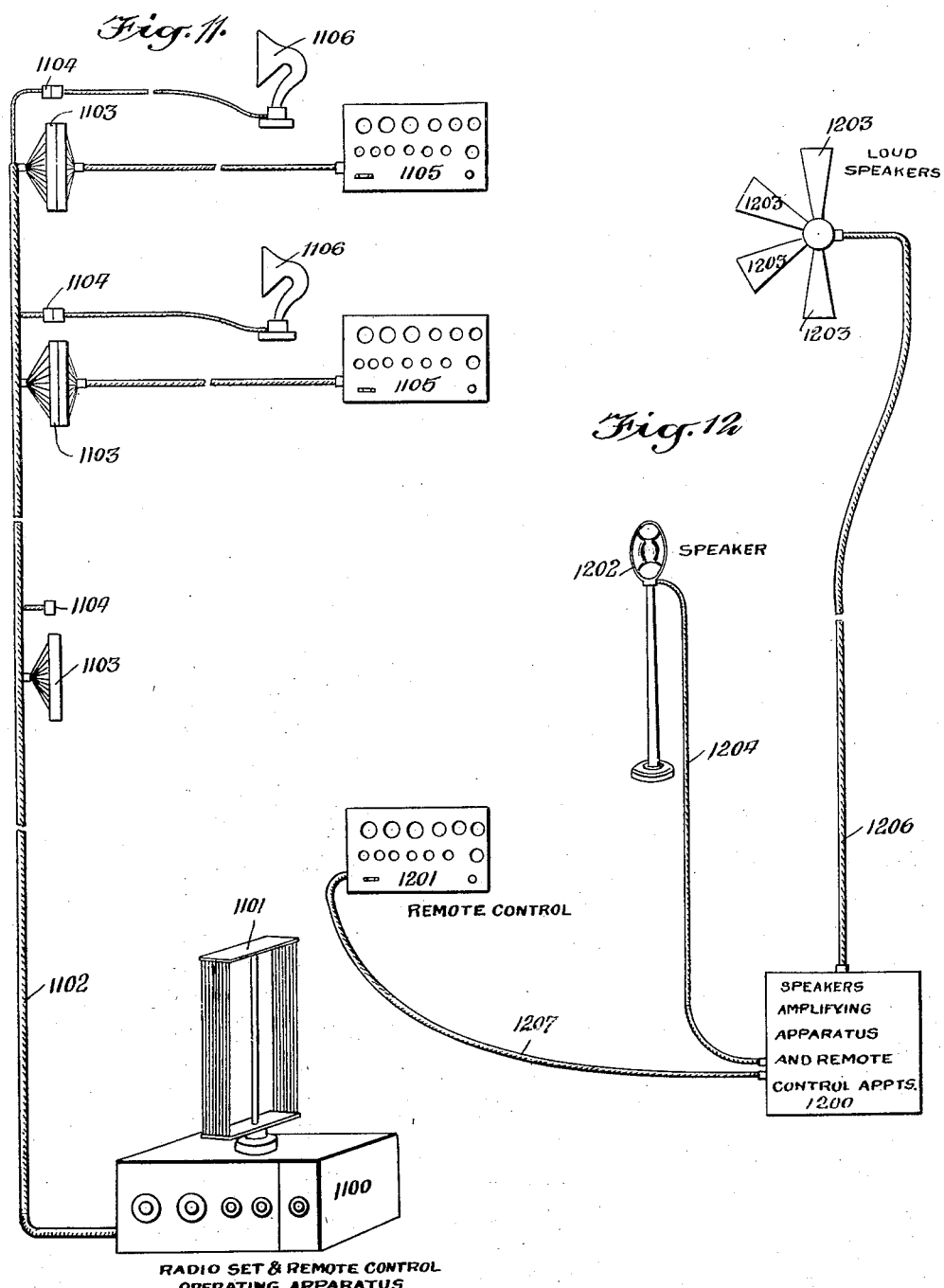

Patented May 19, 1936

2,041,398

UNITED STATES PATENT OFFICE 2,041,398

REMOTE CONTROL SYSTEM

Herbert L. Carpenter, Brooklyn, N. Y.

Application January 25, 1928, Serial No. 249,403

2 Claims. (Cl. 177—311)

This invention relates to remote control systems, and more particularly to systems of that character for controlling the operation of multi-position switches or rheostats. It is particularly adapted for use in conjunction with the dials of radio receiving sets.

The invention further relates to the method of, and means for, controlling a system from a point remote therefrom.

The invention contemplates a new remote control system and particularly a system of that character for controlling the operation of multiple position switches, rheostats, condensers and other electrical and electro mechanical devices requiring changing movement of their position and direction to perform their functions.

One object of this invention is the control of the movement and direction of movement of a multi-position switch, rheostat, dial, or similar device situated at one point, by a person located at a point distant therefrom.

Another object of this invention is the control of the multiple position switch, rheostat, condenser, loop-aerial or similarly operatable device, situated at one point and controlled by a person at a point distant therefrom.

Another object is to provide means whereby the moving control elements of a radio receiving set or other sound producing or regulating apparatus may be located at some convenient point and may be operated at will from one or more remote points with a relatively small and simple remote control instrument with electromechanical indicators to indicate to the operator at a remote point the position and condition of the various operating elements in the sound producing apparatus.

Another object of this invention is to provide means whereby sound producing apparatus may be operated from a remote point and controlled at a point where the sound is being heard, without requiring the manual regulation of the apparatus in the usual control rooms or boards or at a point which may be distant from where the sound is being heard.

A further object of this invention is to provide electromechanical means by which sound producing apparatus and other electromechanical apparatus may be controlled and regulated more sensitively than by manual regulation and movement of the control members.

A further object of this invention is to make it possible to construct and build sound producing and receiving apparatus and other electromechanical apparatus in simple and inexpensive units of a size and arrangement of parts, shielding, covers, etc., best suited to economic and proper operation and to locate such apparatus where desired, and to control its operation from a small, simple and portable control instrument which can be made attractive and operated from a bed, chair, table or other convenient point, and where desired the portable control instrument may be attachable at different places by suitable jacks.

A further object resides in the providing of means whereby the present multiple tube sound producing or receiving apparatus can be constructed very much cheaper than the present art provides with inexpensive cabinets for location in obscure places and yet provide means to completely control such apparatus at various points at a distance from the apparatus with inexpensive portable control instruments, which indicate at any point applied the position and movement of moving parts and whether the main apparatus is in operation from some other remote point or not.

Another object resides in the particular construction and arrangement of parts and electrical circuits, which are hereinafter described and claimed and shown in the accompanying drawings.

Another object of this invention is the method of controlling the quality and/or volume of one or more loud speakers.

Another object of this invention is the method of controlling the quality and/or volume of a broadcasting station, public address system, or any other system of a similar character.

In accordance with this invention, one or more multi-position switches or rheostats, located at point A, are connected over suitable indicator circuits to indicators at a distant point B, which indicators are adapted to vary their position or setting whenever the multi-position switches or rheostats with which they are associated change their respective settings. A suitable source of motive power is provided at point A, which is adapted in combination with a suitable clutch mechanism, to control the separate movement of each of the multi-position switches, and a plurality of actuating circuits between points A and B are provided, which circuits are adapted to be opened or closed individually under control of the operator at point B, to vary the settings of the several multi-position switches at point A which in turn causes a corresponding variation in the settings or their respective associated indicators at point B. Whenever the desired setting is obtained at point B the control circuits are opened and the multi-position switches at point A remain set until the operator at point B, desiring to change the setting at one or more of the multi-position switches, again closes the control circuits at point B.

In the drawings comprising four sheets, numbered Figures 1 to 13 inclusive:

Figure 1 is a schematic drawing of a control circuit and the control apparatus employed in conjunction with a radio receiving set at point A.

Fig. 2 is a schematic drawing of the key circuits and apparatus employed in the control box at point B.

Fig. 3 is a view in perspective of a suitable form of control box, wherein the apparatus shown in Fig. 2 may be assembled.

Fig. 11 is a diagrammatic representation of the arrangement of the equipment of the remote control system.

Fig. 12 is a diagrammatic representation indicating how the remote control system may be employed in an auditorium.

Like reference characters indicate like parts throughout the several figures of the drawings.

Figure 9:
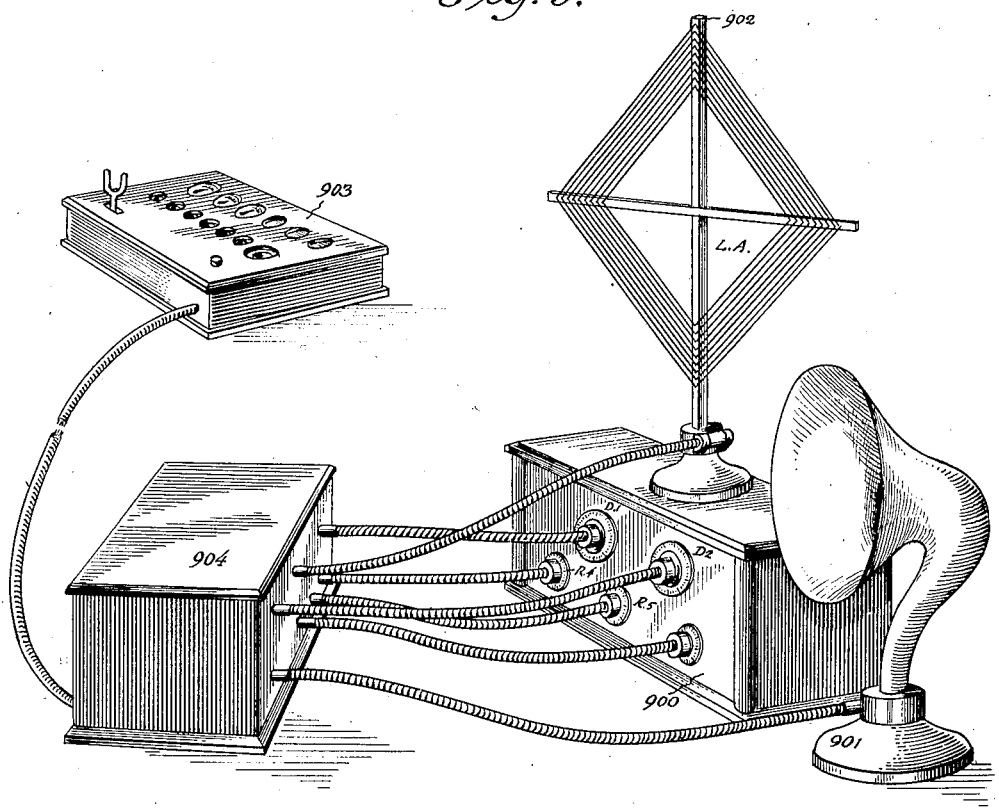
Fig. 9 is a view in perspective of a typical radio receiving set of the character at present in use, including a loop aerial and a loud speaker, illustrating how applicant's control mechanism and remote control box may be combined therewith.

Referring to Fig. 9, it will be observed that the receiving set 900 is equipped with dials representing multi-position switches or rheostats ordinarily used for tuning purposes and for controlling the current in the filament circuits of a plurality of vacuum tubes of the character now generally used for detecting and amplifying the received signals. Ordinarily whenever the operator desires to tune the set the various dials or multi-position switches are operated manually and the effect produced is indicated in the loud speaker 901. Frequently, however, the loud speaker is situated at a distance from the receiving set 900, and sometimes in a different room. Likewise the loop aerial 902 is frequently situated at a point remote from both the receiving set 900 and the loud speaker 901, so that whenever the operator desires to vary the angle of the loop aerial or the strength of the received signals or to tune out one station and tune in another it is necessary for him to go to a distant point in the room or into some other room in order to make the necessary changes.

In order to afford greater flexibility of the apparatus, as well as to relieve the operator of the necessity of moving from one room to another or from one point to another whenever a change in tuning is desired, a control box 904 may be combined with the receiving set and situated adjacent thereto, which control box contains mechanism which is adapted to perform mechanically that which is ordinarily performed by the operator manually, that is, the control box is adapted to rotate the loud speaker, aerial and dials or multi-position switches, back and forth at the will of the operator, who is thus enabled to observe the changed effect produced without moving from his chair. A suitable portable switch box 903 is placed where it is accessible to the operator. This box contains indicators by means whereof the operator is enabled to observe the position of the dials or multi-switches in the receiving set 900 and circuit closing switches for controlling the machinery whereby said dials are operated. Suitable circuits are provided between the portable box 903 and the apparatus in the control box 904, which circuits are capable of being opened or closed by the operator at will to vary the setting of the various dials in the receiving set 900.

Referring to Fig. 1, the receiving set, as indicated within the rectangle bounded by the dotted line, designated by the numeral 100, is located at point A. It may include dials D—1 and D—2, and rheostats R—4, R—5 and R—6, as well as a loop aerial of the general character disclosed at 902 in Fig. 9. The shafts of the dials D—1 and D—2, are operable to operate the tuning mechanism, which may be of any preferred form and the rheostats R—4 and R—5 are operable to control the variable rheostats for varying the filament current of the vacuum tubes, in the usual manner.

Figure 4:
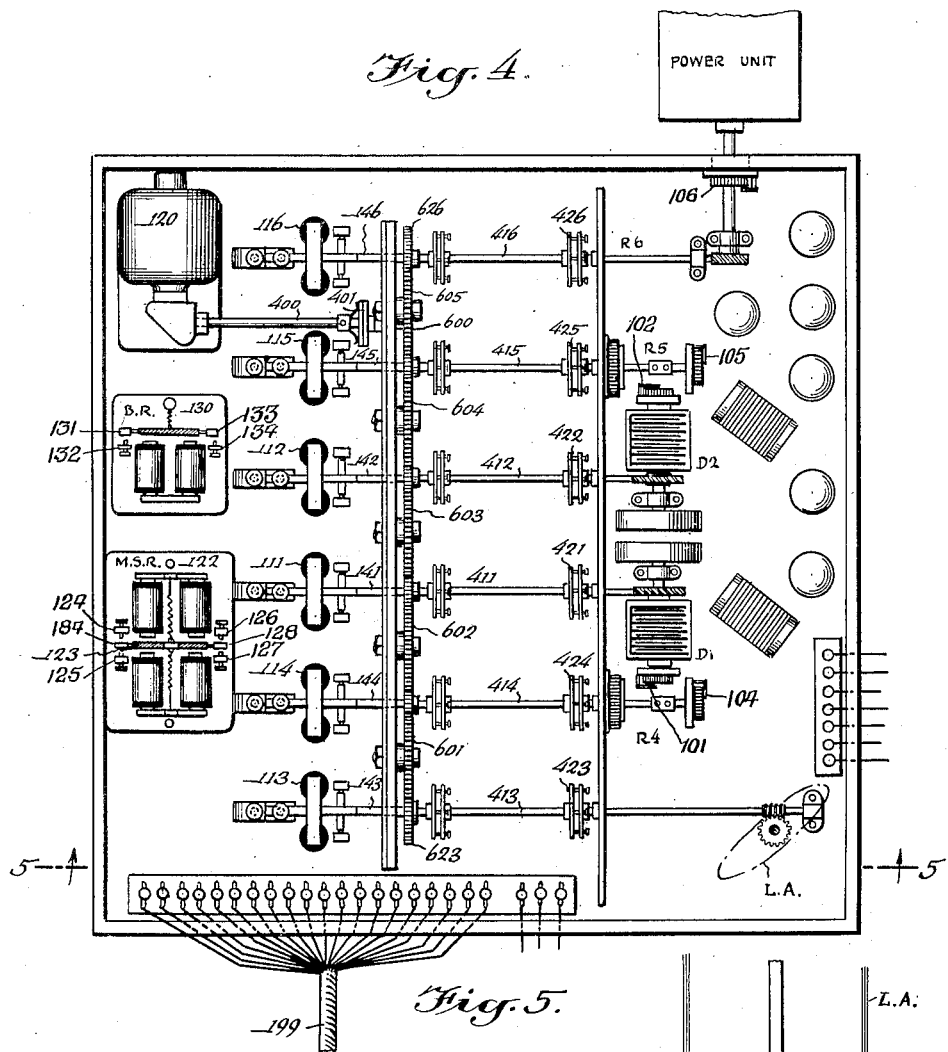
Fig. 4 is a plan view of the assembled apparatus of Fig. 1, particularly showing the relays, gears, and clutch mechanism employed in conjunction with the radio set at point A.

The dials ordinarily used, such for example, as those shown in the receiving set 900, Fig. 9, are replaced by a series of universally jointed shafts such as are shown in Fig. 4, wherein joint 421, Fig. 4, replaces dial D—1, Fig. 1, joint 422 replaces dial D—2, joint 424 dial R—4, joint 425 dial R—5, and joint 426 dial R—6. Joint 423 is connected by means of a shaft to the revoluble loop aerial LA, Fig. 1. Mounted upon the respective shafts and rotating in unison therewith, are contact fingers 101, 102, 104, 105, 106 and 103, (Fig. 1). Contact fingers 101 and 102 pass over resistance coils, and fingers 104, 105 and 106 over arcuate metal strips.

Figure 6:
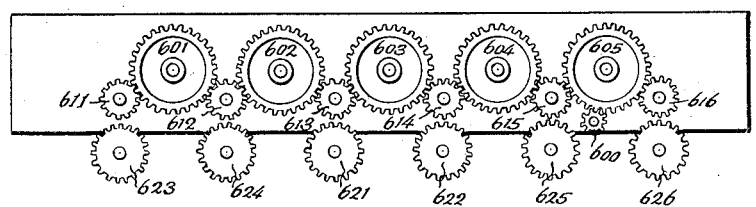
Fig. 6 is a detail drawing of the gears employed.
Figure 7:
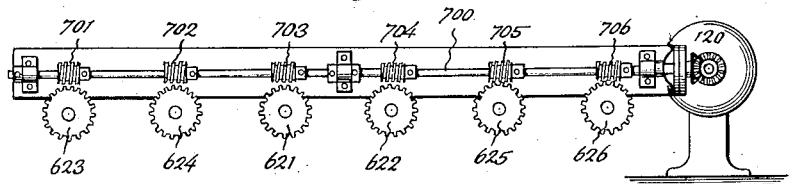
Fig. 7 is an alternative form of driving and gearing mechanism wherein a main driving shaft is employed.

Referring to Fig. 4, 120 represents the source of motive power, in the present case an electric motor, geared by suitable gears to a driving shaft 400. When the motor 120 is operated the shaft 400 is rotated and causes the gears 601 to 605 inclusive, (Fig. 6) to rotate. Or if a driving shaft of the character disclosed in Fig. 7 is employed then said driving shaft 700 would be rotated.

Referring to Figs. 1 and 4, it will be observed that a series of relays 111 to 116 inclusive are provided, which are adapted in one position to separate the gears 621 to 626 inclusive (Fig. 6) from the driving gears 601 to 605 inclusive, and their associated inter-meshing gears 611 to 616 inclusive. In the other position the relays 111 to 116 inclusive, bring the gears 621 to 626 into mesh with the gears 611 to 616 inclusive. Thus whenever the motor 120 is in operation it is possible by operating one or more of the relays 111 to 116 inclusive, to bring one or more of the gears 621 to 626 inclusive, into mesh with the rotating gears 611 to 616 inclusive, whereby said gear (or gears) is caused to rotate, resulting in the rotation in unison therewith of the corresponding shafts 411 to 416 inclusive (Fig. 4) which produces a rotary movement of the corresponding multi-position switch or rheostat.

The principle of operation of the system is as follows:

The operator desiring to listen in upon the receiving set, inserts the plug of the control box (Fig. 2) into one of a series of multi-spring jacks to which the cable 199 is wired. It should be understood that the receiving set may be equipped with a plurality of control boxes of the character indicated in Figs. 2 and 3, each of these control boxes terminating in a multi-contact plug which is adapted to be inserted in a suitable multi-contact jack (two of which are shown), which jacks are located at different points as desired. If, when the plug of the control box is inserted in a jack, the station is in use, the busy relay 130 (Fig. 1) will be operated and a circuit will be closed to light the busy signal 207 as follows: From the positive side of the A battery (Fig. 1) positive main battery feed to Fig. 2, leads 269 and 218, busy signal 207, leads 268 and 168, front contact 132 and armature 131 of relay 130, lead 170 to the negative side of the A battery. The busy signal 207, which we will assume is a miniature electric lamp, will be lighted over this circuit and the operator will then be advised that the receiving set is already in use.

Assuming, however, that when the plug of the control box is inserted in the jack the station is not in use, then the busy relay 130 will not be operated and consequently the circuit for the busy signal will not be closed at front contact 132 and armature 131 of busy relay 130. When the operator fails to receive a positive signal upon the lamp 207 he will understand that the receiving station is idle and will thereupon press the start key 217. Upon so doing, the busy relay will be operated over the following circuit: From the positive side of the A battery (Fig. 1), positive main battery feed, leads 269 and 218, contacts of start key 217, leads 267 and 167, winding of busy relay 130, negative main battery feed lead 170, to the negative side of the A battery. Relay 130 operates over this circuit and connects the negative side of the A battery to the windings of the various relays 141 to 146 (inclusive), to the winding of the motor start relay 122, to the resistance coils associated with the contact fingers 101, 102 and 103, and to the contact fingers 104, 105 and 106. The operation of relay 130 also causes the busy signal 207 to light over the circuit previously described.

It will be understood that any of the switches D—1, D—2, R—4, R—5, R—6 and the loop aerial LA may have been left in any position when the station was last in use, and the operator may find it necessary to determine the position of the various switches. This is accomplished in the following manner: Let us assume that we desire to determine the position of the dial D—1. It will be observed that a resistance coil associated with said dial (see connecting dotted line Fig. 1) is connected across the main battery feeds 169 and 170 of the A battery. This resistance coil accordingly acts as a potentiometer. Across this resistance coil the indicator 201 is connected as follows: From the contact member 101 associated with said resistance, leads 153 and 253, indicator 201, leads 252 and 152 to one side of the winding of resistance 101. The indicator 201 will accordingly operate as a voltameter and register the drop of potential across that portion of the resistance coil between the negative side of the A battery and the point where the contact member rests. The indicator 201 will be calibrated so that amount of deflection of the needle of the indicator 201 will be proportional to the setting of the contact member enabling the operator to tell the exact position of the contact finger 101 at a glance.

Indicators 202 and 203 function in the same manner as indicator 201 so that as soon as the busy relay 130 is operated the operator is immediately informed of the position of the switches D—1 and D—2 and the position of the loop aerial LA.

Ordinarily it is unnecessary to indicate the exact position of the rheostats controlling the filament current to the vacuum tubes in the manner heretofore described, it being sufficient for the operator to note whether or not the rheostats controlling the filament current are normal or off-normal. Under these circumstances an indicator of the type of 201 may not be needed, it being sufficient to substitute therefor a signal lamp of the character of lamps 204, 205 and 206 which are associated, as indicated in Fig. 1, with the rheostats R—4, R—5 and R—6. When a lamp is used instead of a voltameter indicator, an arcuate contact is substituted for the resistance coil. In the normal operation of the rheostat the finger will be in the position of contact finger 105 associated with the rheostat R—5 (Fig. 1). When the rheostat is in a position such that the filament current has reached a critical value the contact finger will assume the position shown by the contact finger 104 (Fig. 1). It will be observed that the contact fingers 104, 105 and 106 are connected to main battery lead 170, thence to the negative side of the A battery, and that the arcuate contacts are connected over leads 158, 159 and 160, respectively, to one side of each of the lamps 204, 205 and 206, respectively, and that the other side of each of the lamps is connected by way of leads 218 and 269 and the main battery feed to the positive side of the A battery. Thus whenever the rheostat R—4 reaches the critical point the circuit for the lamp 204 will be closed at the contact finger 104, and the lamp 204 will light as a warning or danger signal to the operator. Similarly, whenever the rheostats R—5 and/or R—6 are at the critical point the circuits for lamps 205 and/or 206 will be closed at the contact fingers 105 and/or 106, as the case may be, with like effect.

Upon inserting the plug in the jack in the manner heretofore described, the operator may pick up a transmitting station forthwith, assuming that the receiving set is properly tuned for the reception of that station. Ordinarily, however, the operator will find it necessary to tune the receiving station, in which case he will proceed as follows: It will be assumed that after having observed the setting of indicator 201, the operator desires to tune the dial D—1; in that event the key 211 associated with the indicator 201 is closed to operate relay 111 over the following circuit: From the positive side of the A battery, leads 269 and 218, contacts of key 211 now closed, leads 266 and 166, winding of relay 111, front contact 134 and armature 133, lead 170 to the negative side of the A battery. Relay 111 operated attracts its armature, which is of the pivoted lever type, thereby causing gear 621 (Fig. 6) to mesh with gear 613. This operation is best understood from an examination of Figs. 5 and 6 where it will be observed that, whenever relay 113 operates, gear 623 meshes with gear 611.

The source of motive power for driving the gears shown in Figs. 4 to 7, inclusive, is a small electric motor 120. As the motor start key 220 is not operated, however, motor 120 is disconnected and is consequently at rest. As soon, however, as key 211 is depressed, the operator determines from observing the position of indicator 201 whether he desires to rotate dial D—1 clockwise or counterclockwise. If the dial is to be rotated in a clockwise direction, that is, to the right, key 220 is operated, let us assume, to the right so that it makes contact with spring 222. A circuit is now closed to operate the motor start relay 122 as follows: From the positive side of the A battery, leads 269 and 218, motor start key 220, contact spring 222, leads 251 and 151, right-hand winding of motor start relay 122, front contact 134 and armature 133 to the negative side of the A battery. The right-hand winding of motor start relay 124 is energized and armature 123 is attracted so that it makes contact with contacts 125 and 127. It should be understood that the motor start relay 122 may be of any preferred type but I prefer to use a three-position relay, that is, a relay where the armature has a normal position and left and right positions.

When the armature 123 is attracted to the right a circuit is completed to operate the motor as follows: From the power mains, lead 171, armature 123, right-hand contact 127, armature of motor 120, right-hand contact 125, field winding 121, lead 172 to the power mains. The motor 120 now commences to revolve, revolving shaft 400 (Fig. 4), and gear 600 (Fig. 6). Gear 600 drives the intermeshed gears 601 to 605, inclusive, and 611 to 616, inclusive. As the mesh gears rotate, gear 621, which is in mesh with gear 613, will be rotated in unison therewith, thereby causing shaft 411 to rotate and vary the position of the device controlled by the dial D—1, which we will assume to be a tuning condenser. As the dial D—1 rotates in a clockwise direction, the contact finger 101 will rotate in unison therewith, and the indicator 201 will vary its setting likewise in a clockwise direction. If the direction of rotation is continued, the contact finger associated with the rheostat 101 will ultimately reach the extreme position, and at that time the indicator 201 will be deflected to a maximum.

Let us assume, however, that the operator now desires to rotate the dial D—1 in a counter-clockwise direction, that is, to the left. He will accordingly hold key 211 depressed and at the same time move the motor start key 220 from the right-hand position to the left-hand position, thereby opening at contact 222, the circuit heretofore described. At the moment that the circuit was opened at the contact 222, of the motor start key, armature 123 of the motor start relay was released, opening the circuit of the motor 120, which immediately ceased running. This resulted in stopping the intermeshed gears which in turn resulted in the stoppage of gear 621 controlled by relay 111. When the motor start key 220 is placed in the left-hand position, it closes the following circuit at contact 221: From the positive side of the A battery, leads 269 and 218, contacts 220 and 221 of the motor start key, leads 250 and 150, left-hand winding of the motor start relay 122, front contact 134 and armature 133 to the negative side of the A battery. The left hand winding of the motor start relay 122 is now energized, and armature 123 is attracted to the left, closing contacts 124 and 126 to complete the following circuit for the motor: From the power mains, lead 171, armature 123, contact 126, armature of motor 120, contact 124, field 121 of the motor, lead 172 to the power mains. It will be observed that the motor 120 is now connected in the reverse direction and consequently rotates in the reverse direction with the result that the gear 621 is rotated in a counter-clockwise direction. The contact finger 101 rotates in unison with the gear 621 and the shaft 411, all in a counter-clockwise direction. The indicator 201 follows the setting of the contact finger 101 and decreases its deflection in a counter-clockwise direction, that is in the direction of zero.

If the operator desires to vary the position of the dial D—2, the procedure heretofore described for varying the dial D—1 is followed, except that instead of depressing key 211, key 212 is depressed, closing a circuit over leads 265 and 165 to operate relay 112. The operation of relay 112 causes shaft 142 to bring gear 622 into mesh with gear 614. The direction of rotation of gear 622 and, consequently, of dial D—2 and the associated contact finger 102 will be clockwise or counter-clockwise depending upon the right or left position of the motor start key 220. Any variation in setting of the contact finger 102 with respect to its associated resistance will cause the indicator 202 to vary its setting. The circuit for indicator 202 is controlled over leads 154, 254 and 255, 155.

Similarly, to vary the position of the loop aerial LA, the motor start key 220 is turned either to the right or the left position and key 213 is operated in conjunction therewith. Operating the latter key closes a circuit over the leads 264 and 164 to operate relay 113. Relay 113 operated causes gear 623 to mesh with gear 611, thereby causing the loop aerial to rotate and the position of the contact finger 103 to vary. The angle of deflection of the loop aerial is indicated upon indicator 203 which is controlled over a circuit including leads 156, 256 and 257 and 157.

The rheostats R—4 and R—5 are controlled in a similar manner, the circuit for controlling rheostat R—4 including key 214 and relay 114; and the circuit for controlling rheostat R—5 including key 215 and relay 115. The operation of relay 114 causes gear 624 to mesh with gear 612, while the operation of relay 115 causes gear 625 to mesh with gear 615. In the normal operative position of rheostats R—4 and R—5, the contact fingers 104 and 105 do not make contact with their associated arcuate metal segments. As soon, however, as the rheostat reaches the critical point as heretofore described, the contact finger 104 or 105, as the case may be, makes contact with its associated metal segment, thereby extending the negative side of the A battery over leads 158 and 258 to lamp R—4 or over leads 159 and 259 to lamp R—5, thereby lighting the lamp.

In some instances, R—6 may be a rheostat control, as indicated at 100 in Fig. 1, but in the present case it will be assumed that R—6 is intended to control the loud speaker or power unit as indicated in Fig. 4. In any event, the rheostat or power unit at R—6 is controlled by the operation of key 216 which operates relay 116 over leads 261 and 161. Relay 116 operated causes gear 626 to mesh with gear 616 and the direction of movement will depend upon the position of the motor start key 220. Contact finger 106 operates in the same manner as contact fingers 104 and 105 and controls the positive or negative signal displayed by lamp 206.

Figure 8:
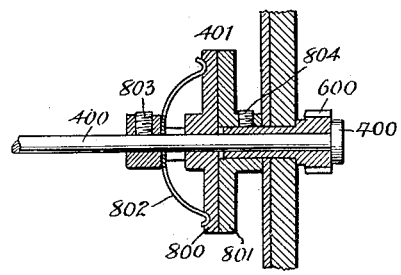
Fig. 8 is an enlarged cross section of one of the friction clutch mechanisms.

If, for any reason, the gear mechanism becomes clogged or locked, after the dials have reached the extreme position, no injury will be done either to the gear mechanism or the motor because a friction clutch of the character disclosed in Fig. 8 is provided which is located at 401 between the main driving shaft 400 and the gear 600, as is best shown in Figs. 4 and 8. When the shaft 400 is rotated, the friction disk 800 is rotated in unison therewith. The surface of the disk 800 is pressed by spring 802 against, and makes good friction contact with, the surface of the disk 801. Disk 801 is locked at 804 to the sleeve gear 600 so that when disk 801 is rotated, main gear 600, which controls the movement of all the gears of Fig. 6, rotates in unison therewith. Whenever the load upon the gear 600 becomes excessive, however, the disk 800 carried by the shaft 400 will continue to rotate so long as motor 120 is rotated, but the disk 801 will remain stationary, thereby preventing any of the gears from stripping or any of the associated mechanism from being injured.

Figure 5:
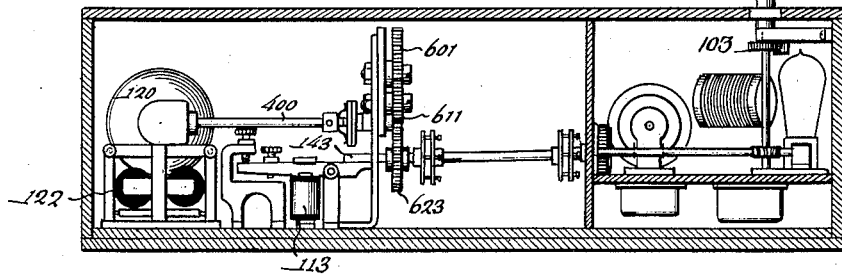
Fig. 5 is a view along the line 5—5 of Fig. 4, looking in the direction of the arrows.
Figure 10:
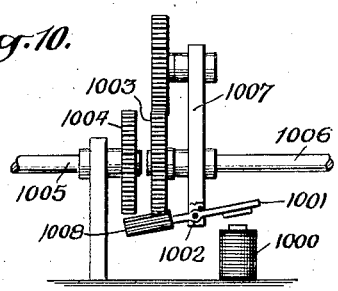
Fig. 10 is a detail view of an alternative form of clutch mechanism.

Fig. 10 illustrates another form of clutch mechanism which may be employed if preferred in place of the clutch mechanism illustrated in Figs. 4, 5 and 6 heretofore described.

The mechanism of Fig. 10 consists of an electromagnet 1000 having an armature 1001 pivoted at 1002 to a suitable standard 1007. Rotatably secured to the opposite end of the armature 1001 is a pinion 1008. Secured to the driving shaft 1006 is a gear 1003 rotatable in unison with the shaft. The shaft 1005 which it is desired to drive is furnished with a gear 1004. In the position of rest the gears 1003 and 1004 are separated, consequently, the shaft 1005 will not rotate. To vary the position of the switch controlled by the shaft 1005 a circuit is closed to energize relay 1000. Armature 1001 is thereby attracted and the pinion 1008 is caused to mesh with gears 1003 and 1004. So long therefore as the relay 1000 is operated the rotary movement of shaft 1006 is transmitted to the gear 1003 thence through the pinion 1008 and gear 1004 to the shaft 1005, thereby varying the position of the switch. When the switch has reached the desired position, relay 1000 will be de-energized causing its armature 1001 to be released whereby the pinion 1008 will disengage with the gears 1003 and 1004 and the shaft 1005 will cease its rotary movement.

Referring to Fig. 11, the receiving set 1100 equipped with the loop aerial 1101 may be placed in any desired position. The unit 1100 will consist of the radio receiving set and remote control apparatus in combination and from the unit a cable 1102 will be carried to any desired point in any room selected where it will be terminated in jacks 1103 and 1104. Jack 1103 is provided to take care of the connections for the control box 1105, which may be similar in all respects to control box of Fig. 2. Jack 1104 is provided to take care of the connections for the loud speaker 1106. Jacks 1103 and 1104 are multiplied in various rooms, as indicated in Fig. 11. In that figure it has been assumed that two control boxes 1105 are connected in the circuit at one time and similarly that two loud speakers 1106 are also connected to the circuit. With the apparatus in the condition illustrated in Fig. 11 it would be possible for an operator at either control box 1105 to control the operation of the radio receiving set and the remote control apparatus in the unit 1100, as well as the position of the loop aerial 1101, thereby reproducing the program broadcasted from the broadcasting station in each of the loud speakers 1106.

Fig. 12 illustrates how the invention may be combined with a bank of loud speakers and a microphone at a public gathering. A suitable unit 1200 embodies the apparatus for controlling the circuit of the speaker 1202 and the circuits of the bank of loud speakers 1203 may be assembled in a single cabinet.

The orator when addressing an audience in the ordinary way has the speaker or microphone 1202 connected by means of a suitable cable 1204 to the control apparatus 1200 which may be situated either in the auditorium or at some point adjacent thereto. The remote control apparatus 1200 is likewise connected by means of a suitable cable 1206 to a bank of loud speakers 1203 situated either in the auditorium or external thereto. The remote control box 1201 is likewise connected by means of a suitable cable 1207 to the control apparatus 1200. The operator having custody of the remote control unit 1201 may be seated at some point in the auditorium where he is in a position to listen to the speech broadcasted by the loud speakers 1203. Whenever the operator desires to increase the volume or quality of the speech, all he needs to do is to depress the key controlling the output either of the microphone 1202 or of the loud speakers 1203 or any or all of them as the case may be, and to observe the result of the variation thus produced in the volume and quality of the broadcasting by the loud speakers 1203. A unit of this character in the custody and control of a capable operator will obviate many of the difficulties heretofore inherent in the broadcasting of speeches by means of a public address system.

Figure 13:
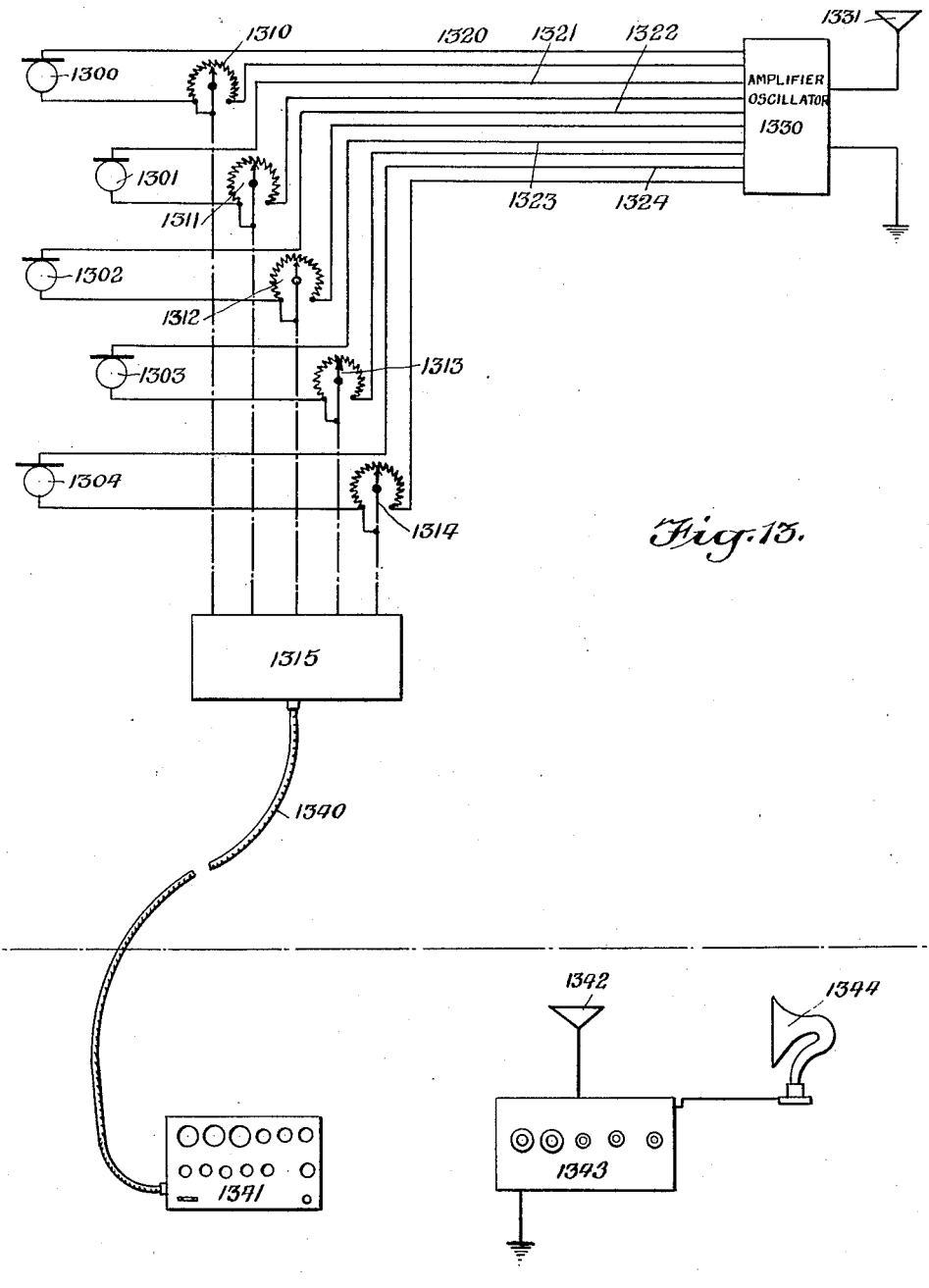
Fig. 13 illustrates another application of the remote control system used in conjunction with a broadcasting station.

Fig. 13 illustrates another application of the invention to the control of a broadcasting station. The microphones 1300 to 1304 inclusive, are intended to be placed at various points in the studio or at various points in an orchestra for the purpose of picking up the subject matter which it is intended to broadcast. The rheostats 1310 to 1314 inclusive, are intended to control the flow of current in each of the microphones 1300 to 1304 inclusive, respectively.

As will be observed, the microphone circuits are connected to a suitable amplifier and oscillator unit indicated in blank at 1330 where the undulating currents set up by the speech waves in the several microphones are amplified and broadcasted by means of the aerial 1331. A receiving station is provided consisting of the ordinary conventional receiving set including an aerial 1342, a control box 1343 and a loud speaker 1344 and the operator having the custody and control of the control box 1341 is able to listen to the program actually broadcasted from the broadcasting station. It will be understood that the receiving unit indicated in the lower portion of Fig. 13 may be situated either adjacent to the broadcasting station or at a point remote therefrom. All that is necessary is that the control box 1341 shall be connected by a suitable cable 1340 from the receiving station to the remote control operating apparatus 1315 controlling the microphones 1300 to 1304 inclusive.

In operation the system functions as follows: The orchestra or the actors proceed to perform their act at the studio and the various microphones 1300 to 1304 inclusive pick up the music or voice and the currents thus produced are amplified and broadcasted by the aerial 1331 of the broadcasting station. The operator at the receiving station listens in upon his receiving set consisting of the aerial 1342, unit 1343 and loud speaker 1344 and is enabled to observe the quality and volume of the music thus detected. If the quality or volume is not satisfactory, the operator merely depresses the key controlling one or more of the microphones 1300 to 1304 inclusive, thereby causing the apparatus in the control box 1315 at the broadcasting station to be energized to vary the position of one or more of the variable resistances 1310 to 1314 inclusive. The operator is enabled to observe the effect of the manipulation of the switches and when the desired quality or volume has been obtained the key or keys of the control box 1341 which has been depressed are released and the rheostat controls of the variable resistances 1310 to 1314 inclusive again come to the position of rest. The principal advantage of a system of the character set forth in Fig. 13 is that the operator knows that he is picking up the program as actually broadcasted and that if the quality and volume at his receiving set is satisfactory the quality and volume in other receiving sets similarly situated will also be satisfactory.

While for purposes of illustration, the control box 1341 is connected by a cable 1340 to the control apparatus 1315 which is indicated as adapted to control the current output of the microphones, it should be understood that the control box 1341 might also be connected by a suitable cable to the controls for the amplifier and oscillator 1330 so that the operator would be in a position to control not only the microphones but also the amplifier and oscillator controls.

The inventive concept is of course not necessarily limited to its adaptation to the remote control of the broadcast of human speech. It is equally applicable to any system wherein it is desired to operate an electrically-operated device to produce an effect for the amusement or edification of an audience while at the same time providing a control device adapted to be operated by some person who, being positioned among, and forming a part of, the audience, whereby he is enabled to observe the effect produced as normally received by other members of the audience, is thereby in a position to control the operation of the electrically-operated device to vary the effect produced, while simultaneously observing the character of the changes as fast as the same are produced.

What is claimed is:

1. In a radio remote control system, a receiving station having a plurality of movable members, a plurality of remote control stations, means for connecting any of said control stations with said receiving station, means cooperating with the first means for moving any of said movable members at said receiving station from any of said remote control stations, and indicating means at each control station operated in response to the operation of the second means at another station for indicating the position of the movable member being controlled.

2. In a radio control system, a receiving station having a plurality of movable members, remote control stations, indicators at each of said control stations, circuits for controlling the movable members and the indicators, means connected in said circuits for electrically connecting any one of said control stations with said receiving station to thus cause an indicator at each control station to move in response to the adjustment of the selected movable member to indicate the position of the latter.

HERBERT L. CARPENTER.